(12) United States Patent  
Nakao et al.

(10) Patent No.: US 7,501,610 B2
(45) Date of Patent: Mar. 10, 2009

(54) COMPOUND-EYE IMAGING DEVICE

(75) Inventors: Yoshizumi Nakao, Daito (JP); Takashi Toyoda, Daito (JP); Yasuo Masaki, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 140 days.

(21) Appl. No.: 11/550,068

(22) Filed: Oct. 17, 2006

(65) Prior Publication Data

US 2007/0115459 A1 May 24, 2007

(30) Foreign Application Priority Data

Oct. 17, 2005 (JP) ............................. 2005-302291

(51) Int. Cl.
*H01L 27/00* (2006.01)
*H04N 7/18* (2006.01)

(52) U.S. Cl. .................................. 250/208.1; 348/152
(58) Field of Classification Search .............. 250/208.1; 348/152–155
See application file for complete search history.

(56) References Cited

U.S. PATENT DOCUMENTS

| 7,009,652 | B1 | 3/2006 | Tanida et al. |
| 2002/0050518 | A1* | 5/2002 | Roustaei ..................... 235/454 |
| 2003/0086013 | A1 | 5/2003 | Aratani |
| 2004/0212677 | A1 | 10/2004 | Uebbing |
| 2006/0072029 | A1 | 4/2006 | Miyatake et al. |

FOREIGN PATENT DOCUMENTS

| JP | 2001-61109 A | 3/2001 |
| JP | 2003-143459 A | 5/2003 |
| JP | 2003-283907 A | 10/2003 |
| JP | 2003-283932 A | 10/2003 |
| JP | 2003-319235 A | 11/2003 |
| JP | 2004-146619 A | 5/2004 |
| JP | 2004-328736 A | 11/2004 |

\* cited by examiner

*Primary Examiner*—Thanh X Luu
(74) *Attorney, Agent, or Firm*—Crowell & Moring LLP

(57) ABSTRACT

A compound-eye imaging device comprising: an optical lens array with multiple integrated optical lenses having mutually parallel optical axes; a photodetector array placed at a predetermined distance from the optical lens array for imaging multiple images (referred to as single-eye images) formed by the optical lenses; and a microprocessor for reading the single-eye images imaged by the photodetector array. The image reading mode of the microprocessor is switchable between an all-read mode in which all the single-eye images on the photodetector array are sequentially read, and a partial-read mode in which a part of the single-eye images thereon are selectively read. The image reading speed of the microprocessor is changeable. The compound-eye imaging device enables a high frame rate and a high resolution imaging while reducing an increase in a clock frequency for the frame rate and thus reducing an increase in power consumption.

7 Claims, 3 Drawing Sheets

COMPOUND-EYE IMAGING DEVICE

BACKGROUND OF THE INVENTION

1. Field of the Invention

The present invention relates to a compound-eye imaging device having an optical imaging system formed of multiple micro optical systems, in which multiple images imaged by the micro optical systems are reconstructed into one image.

2. Description of the Related Art

There has been developed a compound-eye imaging device as a thin camera module to be installed in a cellular phone, a personal computer, or the like. The compound-eye imaging device is mainly composed of: an optical lens array with multiple integrated optical lenses having mutually parallel optical axes; a photodetector array for imaging multiple images (single-eye images) formed by the respective optical lenses of the optical lens army; and an image reconstructing circuit for reconstructing one image from the multiple single-eye images imaged by the photodetector array by using parallax information between the multiple single-eye images.

The multiple single-eye images formed on the photodetector array are sequentially read, one-by-one, along the array by an image reading means formed of a microprocessor having a reading speed which is determined on the basis of a clock generated by the microprocessor, and are reconstructed by the image reconstructing circuit into one image after all the single-eye images are read. Thus, if an attempt is made to display a reconstructed image on a display screen such as an LCD (Liquid Crystal Display) monitor at a relatively high frame rate (number of images renewed per unit time), it is required to increase the reading speed to read the single-eye images from the photodetector array This makes it necessary to increase the clock frequency of the microprocessor, which causes a problem of an increase in power consumption.

Applications of a compound-eye imaging device include e.g. a monitoring camera system, which has a requirement in the frame rate as described below. In normal imaging in which no anomaly is detected, there is no problem with a monitoring camera system to image at a low frame rate and a low resolution. However, in order to track a suspicious moving object once detected by the monitoring camera system, it is necessary to image the object at a high frame rate. Thereafter, when the object slows its movement, while being tracked, making it possible to capture an identifiable image of the object, a high frame rate is not much required.

Rather, it is desirable to image the object at a high resolution so as to determine the outline and detail of the suspicious object. That is, a monitoring camera system is desired to be switched in the following sequence: imaging at a low resolution and a low frame rate→imaging at a low resolution and a high frame rate→imaging at a high resolution and a low frame rate. In other words, in an imaging system for detecting a moving object as represented by the monitoring camera system, it is desirable that the frame rate can be switched to different ones depending on the situation, with the highest frame rate being as high as possible, and that a high resolution imaging can be performed.

According to conventional compound-eye imaging devices, increasing the reading speed (increasing the clock frequency) is the only way to enable a high frame rate and switching between different frame rates. However, the increase in the clock frequency causes an increase in power consumption as described above, so that it is difficult to obtain a sufficiently high frame rate. Furthermore, a technology is known to intermittently remove pixels read by light receiving elements so as to increase the reading speed. However, although this technology enables a high reading rate and a high frame rate, the resultant image may have a false color if pixels of a certain color are not uniformly removed.

SUMMARY OF THE INVENTION

An object of the present invention is to provide a compound-eye imaging device that easily enables a high frame rate and imaging at a high resolution while reducing, as much as possible, an increase in a clock frequency for increasing the frame rate, and an increase in power consumption caused thereby.

According to the present invention, this object is achieved by a compound-eye imaging device comprising: an optical lens array with multiple integrated optical lenses having optical axes parallel to each other; a photodetector array placed at a predetermined distance from the optical lens array for imaging multiple images which are respectively formed by the multiple optical lenses (such images being hereafter referred to as single-eye images); and an image reading means for reading, at a predetermined reading speed in one of predetermined image reading modes, the single-eye images imaged by the photodetector array, The predetermined image reading modes include an all-read mode in which all the single-eye images on the photodetector array are sequentially read, and a partial-read mode in which a part of the single-eye images on the photodetector array are selectively read, the image reading means being switchable between the all-read mode and the partial-read mode.

The compound-eye imaging device of the present invention has advantages as described below. For example, assume that the compound-eye imaging device of the present invention is applied to a monitoring camera system. In normal imaging in which no anomaly is detected, there is no problem with the monitoring camera system to image at a low frame rate and a low resolution by switching the image reading mode to the partial-read mode. This is advantageous because the partial-read mode, as an image reading mode, can reduce power consumption as compared with the case of the all-read mode. Since a conventional compound-eye imaging device reads all images in an all-read mode even in the normal imaging in which no anomaly is detected, the compound-eye imaging device according to the present invention can achieve lower power consumption than the conventional one by switching the image reading mode to the partial-read mode.

Further, also when the monitoring camera system with the compound-eye imaging device of the present invention applied thereto detects anomaly and tracks a suspicious moving object, there is no problem with the monitoring camera system to image at a low resolution by switching the image reading mode to the partial-read mode. Thus, the compound-eye imaging device of the present invention can achieve lower power consumption than the conventional one, which reads all images in the all-read mode even in the normal imaging. In tracking a suspicious moving object, it is desirable to image at a high frame rate. The frame rate in the partial-read mode can be higher than that in the all-read mode without need to increase the clock frequency. This means that when tracking a suspicious moving object, the frame rate can be increased by switching the image reading mode to the partial-read mode, while reducing, as much as possible, an increase in the clock frequency and an increase in power consumption caused thereby.

When the monitoring camera system using the compound-eye imaging system of the present invention tracks a suspicious object, and then the object slows its movement, making it possible to capture an identifiable image of the object, it is desirable for the monitoring camera system to image the object at a high resolution so as to determine the outline and detail of the object. The monitoring camera system using the compound-eye imaging system of the present invention can image the object at a high resolution by switching the image reading mode to the all-read mode when it becomes possible for the object be imaged.

Preferably, the compound-eye imaging device further comprises an image reconstructing means for reconstructing the multiple single-eye images read by the image reading means into one image by using parallax information between the multiple single-eye images, and is connected to a display means for displaying images including the one image reconstructed by the image reconstructing means, wherein when the image reading means is in the all-read mode, a higher resolution image is displayed on the display means than in the partial-read mode.

Further preferably, the predetermined reading speed of the image reading means is changeable.

The partial-read mode can be a one-read mode for reading one single-eye image on the photodetector array.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
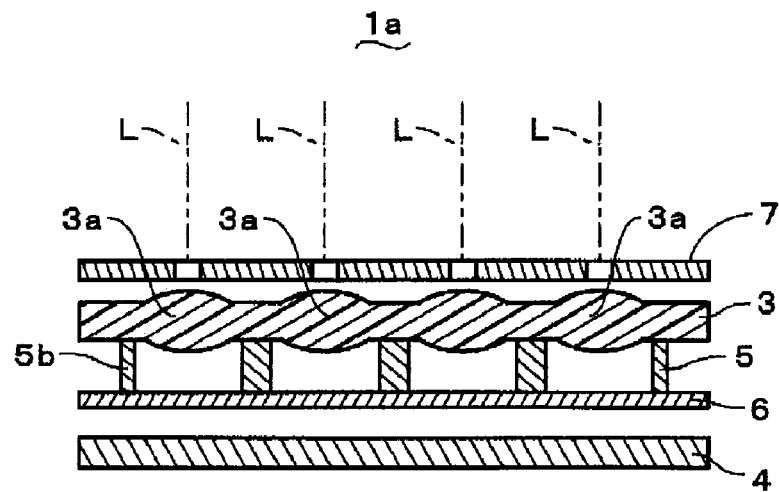
FIG. 1 is a schematic side cross-sectional view of an optical imaging unit 1a along line X-X' of FIG. 2 to be used for a compound-eye imaging device according to an embodiment of the present invention.

Embodiments of the present invention, as best mode for carrying out the invention, will be described hereinafter with reference to the drawings. The present invention relates to a compound-eye imaging device. The following embodiments describe examples in which the compound-eye imaging device of the present invention is used as an imaging device for a monitoring camera system, first of all, as well as a cellular phone and a face authentication system. It is to be understood that the embodiments described herein are not intended as limiting, or encompassing the entire scope of, the invention. Note that like parts are designated by like reference numerals or characters throughout the drawings.

Figure 2:
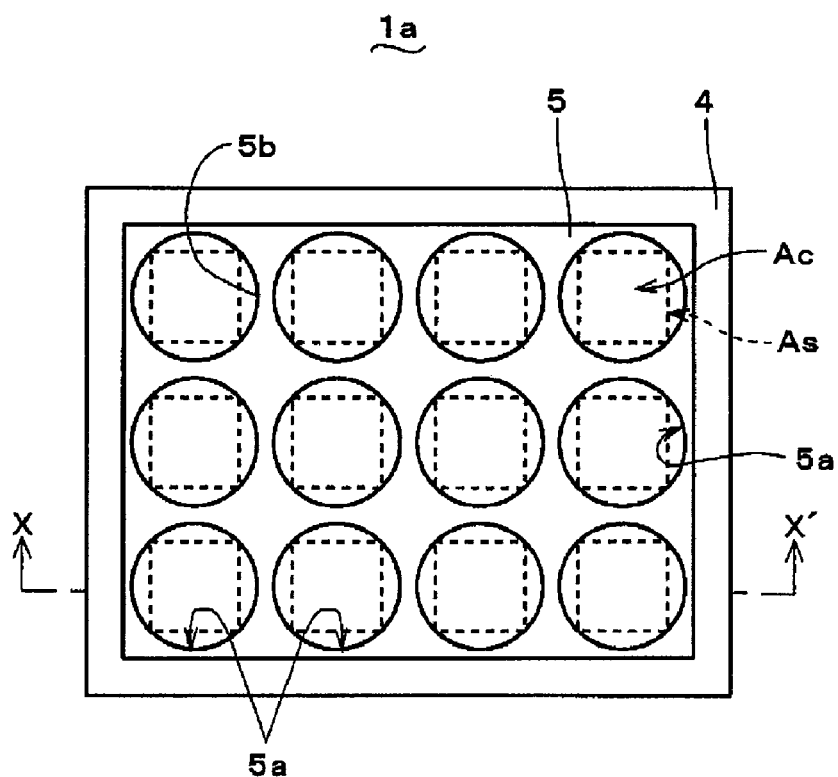
FIG. 2 is a schematic plan view of the optical imaging unit, showing an arrangement of a light shielding block and a photodetector array.

FIG. 1 is a schematic side cross-sectional view of an optical imaging unit 1a along line X-X' of FIG. 2 to be used for a compound-eye imaging device 1 (refer to FIG. 3) according to an embodiment of the present invention, while FIG. 2 is a schematic plan view of the optical imaging unit 1a, showing an arrangement of a light shielding block 5 and a photodetector array 4. As shown in FIG. 1 and FIG. 2, the optical imaging unit 1a comprises: an optical lens array 3 having 12 (twelve) optical lenses 3a as 12 single or unit eyes which have optical axes L parallel to each other, and which are arranged in a matrix of three rows and four columns and mutually integrally formed on one plate; and a photodetector array 4 which is placed below, and at a predetermined distance from, the optical lens array 3, and which has 12 photodetector areas, also arranged in a matrix of three rows and four columns corresponding to the optical lens array 3, for imaging 12 single-eye images Ac formed by the 12 optical lenses 3a.

The optical imaging unit 1a further comprises: a light shielding block 5 which is placed between the optical lens array 3 and the photodetector array 4, and which has a partition wall 5b for partitioning a space between the optical lens array 3 and the photodetector array 4 into a matrix (three rows/four columns) of spaces as seen on a plane perpendicular to the optical axis L; an optical filter 6 placed under the light shielding block 5 for passing only visible light among light components emitted from the optical lenses 3a; and a stop member 7 placed above the optical lens array 3 for shielding unnecessary ambient light from entering the respective optical lenses 3a. Note that the optical filter 6 can also be a filter for passing only infrared light, or a filter for passing both visible light and infrared light.

As shown in FIG. 2, the light shielding block 5 and the photodetector array 4 are each rectangular plate-shaped, and are placed to overlap each other as seen in plan view. The photodetector array 4 is formed of a semiconductor substrate which has a rectangular shape as seen in plan view, and for example, is a CMOS (Complementary Metal Oxide Semiconductor) image sensor, a CCD (Charge Coupled Device) image sensor, or the like. The light shielding block 5 is a rectangular parallelepiped block also having a rectangular shape as seen plan view, which however is a little smaller than that of the light receiving element 4. The light shielding block 5 is formed of a partition wall 5b which has circular apertures 5a facing the respective optical lenses 3a of the optical lens array 3, and which partitions the space between the optical lens array 3 and the photodetector array 4 into a matrix of spaces as seen on a plane perpendicular to each optical axis L.

Thus, light from an object to be imaged is limited by the stop member 7 to a predetermined amount and enters the respective optical lenses 3a of the optical lens array 3. On the other hand, lights emitted from the respective optical lens 3a arrive on the photodetector array 4 without interfering each other because of the partition wall 5b of the light shielding block 5 so as to each form a circular image (single-eye image) Ac corresponding to each circular aperture 5a of the light shielding block 5.

When necessary, an all-read mode is performed. As will be described later with reference to FIG. 3, the switching of the reading mode between the all-read mode and a one-read mode, or more broadly, selection of one of predetermined image reading modes, is done by a mode switching circuit 12 which is operated by a user using a user operation unit 12. The one-read mode is a representative example of a partial-read mode as will also be described later. In the all-read mode, the 12 single-eye images Ac formed on the photodetector array 4 are sequentially read from the photodetector array 4 as electric signals, respectively, and are reconstructed into an image displayed on a display unit 15 (refer to FIG. 3 later) such as an LCD (Liquid Crystal Display) monitor, using a later described microprocessor provided on the same semiconductor substrate that forms the photodetector array 4. When each single-eye image Ac is read from the photodetector array 4 so as to be reconstructed into the reconstructed image, a square image As inscribed inside the circle of each circular single-eye image Ac is cut out from the circular single-eye image Ac and used. Note that each aperture 5a of the light shielding block 5 can be rectangular-shaped.

More specifically, the single-eye images Ac formed on the light receiving array 4 are read therefrom by the microprocessor at one of predetermined reading speeds (reading rates) determined on the basis of a clock generated by the microprocessor in a manner described below. For example, with reference to the rows and columns of the optical lenses 3a of FIG. 2, the single-eye images Ac are sequentially read, one by one, from the uppermost row to the lowermost row, and from the leftmost column to the rightmost column in each row, that is, single-eye image Ac at the uppermost row and the leftmost column→single-eye image Ac at the uppermost row and the second leftmost column→single-eye image Ac at the uppermost row and the third leftmost column→single-eye image Ac at the uppermost row and the rightmost column→single-eye image Ac at the middle row and the leftmost column→single-eye image Ac at the middle row and the second leftmost column→single-eye image Ac at the middle row and the third leftmost column . . . →single-eye image Ac at the lowermost row and the leftmost column→ . . . →single-eye image Ac at the lowermost row and the rightmost column.

Note that the compound-eye imaging device 1 (refer to FIG. 3) according to the present embodiment is designed so that the reading speed (reading rate) determined on the basis of the clock generated by the microprocessor can be changed in multiple stages by using e.g. a multiplier. Furthermore, in the present embodiment, the reading of the single-eye image Ac can be switched by a command signal from a later described mode switching circuit 12 between an all-read mode in which all the twelve single-eye images Ac are read all together as described above, and a one-read mode in which only one single-eye image (hereafter referred to as representative single-eye image) Ac is read. Here, the representative single-eye image Ac, or the light receiving element for the representative single-eye image Ac (such light receiving element being hereafter referred to as representative light receiving element), is normally predetermined such as the one at the middle row and the second leftmost column of the matrix.

Figure 3:
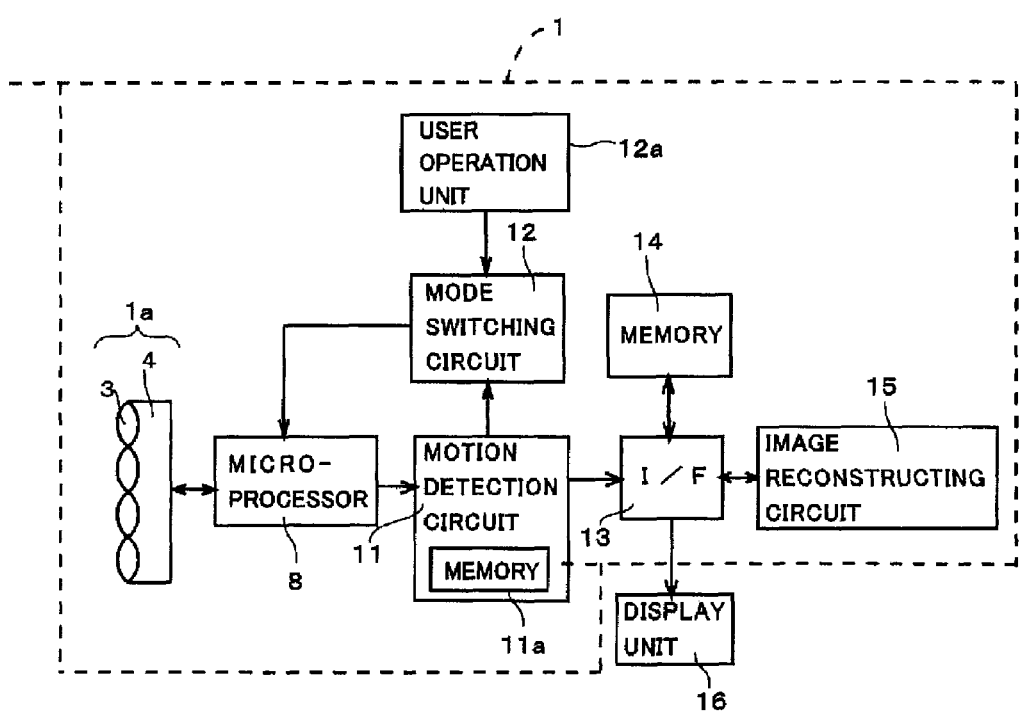
FIG. 3 is a schematic block diagram of the compound-eye imaging device to be used for a monitoring camera system.

FIG. 3 is a schematic block diagram of a compound-eye imaging device 1 according to the present embodiment which is assumed to be used for a monitoring camera system, and which includes the optical imaging unit 1a representatively shown by the optical lens array 3 and the photodetector array 4. Other than the optical imaging unit 1a, the compound-eye imaging device 1 comprises a microprocessor 8 (claimed "image reading means"), a motion detection circuit 11, a mode switching circuit 12, a user operation unit 12a, an interface (I/F) 13, a memory 14 and an image reconstructing circuit 15 (claimed "image reconstructing means") as described below. The microprocessor 8 provided on the semiconductor substrate forming the photodetector array 4 is connected to the motion detection circuit 11 which is provided either on the same semiconductor substrate or on a different semiconductor substrate.

The microprocessor 8 and the mode switching circuit 12 are designed so that the reading speed of the microprocessor 8 to read the photodetector array 4 can be selected from predetermined reading speeds by the reading speed switching signal from the mode switching circuit 12. The microprocessor 8 and the mode switching circuit 12 are further designed so that the mode switching circuit 12 can be operated by a user using the user operation unit 12a to output a read-mode command signal to the microprocessor 8 to operate in either the all-read mode or the one-read mode (or broadly partial-read mode described later). Note that the mode switching circuit 12 can be integrally provided within the microprocessor 8, or can be integrally provided within another microprocessor separate from the microprocessor 8.

The single-eye images Ac on the photodetector array 4 which have been read by the microprocessor 8 are input to the motion detection circuit 11, and are further input to the image reconstructing circuit 15 via the interface 13. The motion detection circuit 11 has a memory 11a therein for storing a single-eye image Ac of a predetermined representative light receiving element. The motion detection circuit 11 performs an image analysis to compare a current single-eye image Ac of the predetermined representative light receiving element with a preceding single-eye image Ac of the same light receiving element, so as to detect a motion in the single-eye image Ac, more specifically detect a change or difference between the preceding single-eye image Ac and the current single-eye image Ac, thereby detecting entry of an object such as a suspicious object. By using parallax information between the thus input 12 single-eye images Ac, the image reconstructing circuit 15 reconstructs one image from the single-eye images Ac.

The thus reconstructed image is sent back to the interface 13, and is further sent to a display unit 16 (claimed "display means"), such as an LCD monitor, for display thereon. The memory 14 stores various information such as camera number and date of imaging. Such information is superimposed, as appropriate, on a reconstructed image displayed on the display unit 16. By repeating the above-described process of reconstructing an image, reconstructed images are sequentially displayed on the display unit 16. Based on an operation by a user, one or some of the reconstructed images are stored in the memory 14 as appropriate.

The above has described an operation in an all-read mode which gives a resultant clearer or higher resolution image on the display unit 16 than in a one-read mode. Thus, the all-read mode can also be referred to as high resolution imaging or high resolution mode. The user can operate the user operation unit 12a to switch the mode switching circuit 12 to operate in one of the image reading modes. In normal operation, the one-read mode is preferable in view of power consumption, because the power consumption in the one-read mode, which is consumed by only the representative light receiving element, is less than that in the all-read mode consumed by all the light receiving elements. This will be described in more detail later. In the one-read mode, a representative single-eye image Ac is read from the photodetector array 4 as an electric signal, and is displayed on the display unit 16 via the motion detection circuit 11 and the interface 13. The motion detection circuit 11 performs the image analysis for motion detection in the same way as that performed in the all-read mode described above.

If the motion detection circuit 11 detects a change in the single-eye image Ac (for example, detects a suspicious object) based on the comparison between the preceding and current images, the motion detection circuit 11 outputs a motion detection signal (change detection signal) to the mode switching circuit 12. The mode switching circuit 12, in turn, outputs a reading speed switching signal to the microprocessor 8 to switch the reading speed of the microprocessor 8 to a higher reading speed. This is in order to more clearly detect the motion or change e.g. of the suspicious object. This mode can be referred to as high speed imaging.

Figure 4:
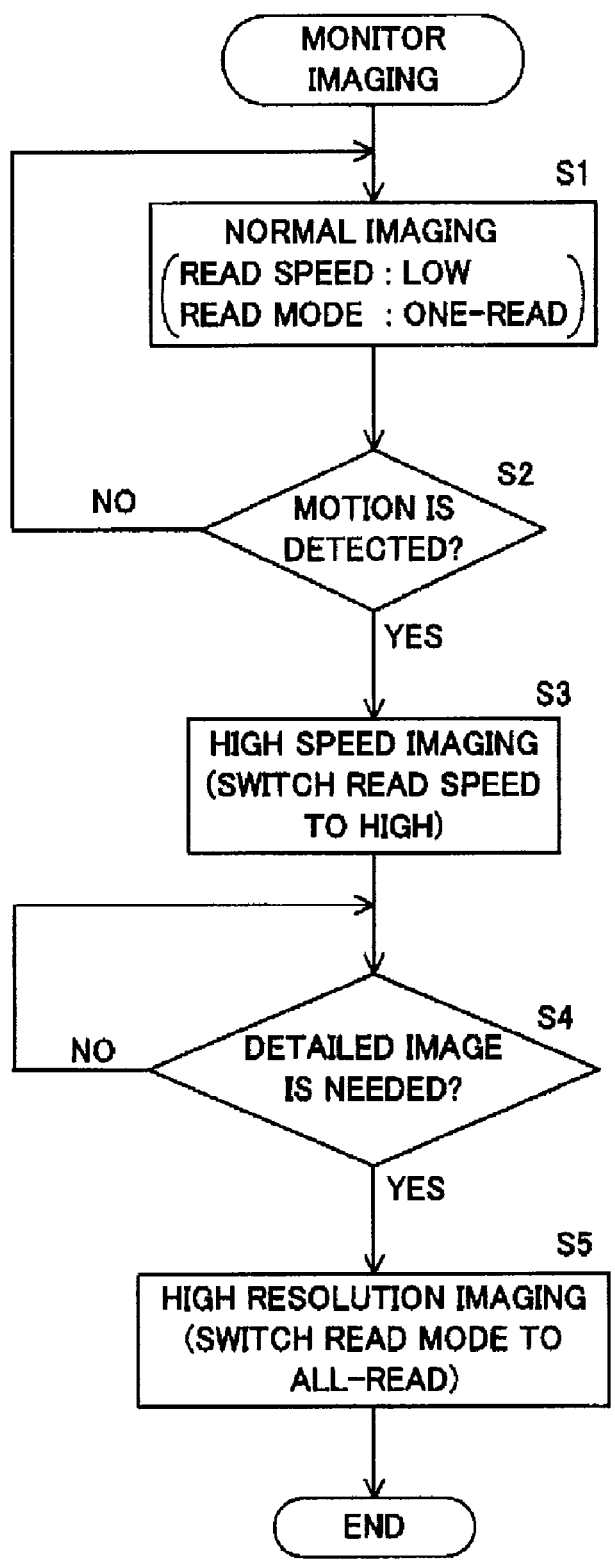
FIG. 4 is a flowchart showing an operation (monitor imaging) of the compound-eye imaging device as the monitoring camera system.

Referring now to the flowchart of FIG. 4, the following describes an operation of the compound-eye imaging device 1 as a monitoring camera system, or monitor imaging, particularly the switching of the reading speed and the switching of the image reading mode. During operation of imaging for normal monitoring (normal imaging), the reading speed and the image reading mode of the microprocessor 8 to read the photodetector array 4 are respectively set at a low speed and a one-read mode to read one representative single-eye image Ac (S1). Since the reading speed is low in the normal imaging, the compound-eye imaging device 1 can be operated with low power consumption. Since the normal imaging of the monitoring camera system occupies most of the time in which the monitoring camera system operates, the low power consumption is very advantageous in reducing the cost of operating the monitoring camera system.

In the normal imaging, the image reading mode is thus set at the one-read mode, so that the representative single-eye image Ac (only one single-eye image) is repeatedly read by the microprocessor 8. Accordingly, if, in the one-read mode, it is allowed to use the same power consumption as that in the all-read mode, the renewal frequency (frame rate) of images sent or input to the motion detection circuit 11 from the microprocessor 8 in the one-read mode can be made the same as that in the all-read mode, even if the reading speed itself of the microprocessor 8 in the one-read mode is lower than that in the all-read mode. This is advantageous because a higher image renewal frequency (frame rate) enables better (more accurate) detection of a change or motion in each image (or screen) to be displayed on the display unit 16.

The difference in operation between the all-read mode and the one-read mode can be described more specifically below. Assuming that a base speed (speed V) is used for the reading speed, and that the image renewal frequency (frame rate) in the all-read mode is once (one time) per unit time, then the image renewal frequency (frame rate) in the one-read mode switched from the all-read mode becomes 12 times per unit time. However, since the normal imaging e.g. in a monitoring camera system in general only requires a low frame rate e.g. of once per unit time, a high frame rate such as 12 times per unit time is not required in the normal imaging. This means that the reading speed in the normal imaging can only be, for example, one-twelfth of the base rate V. Note that the images in the normal imaging at the low frame rate and the low resolution are output to the display unit 16 through the interface 13 without going through the image reconstructing circuit 15.

Now, when the motion detection circuit 11 detects no change in the image of the representative single-eye image Ac, the microprocessor 8 goes back to step S1. On the other hand, when the motion detection circuit 11 detects a change in the image of the representative single-eye image Ac (YES in S2), the motion detection circuit 11 outputs a motion detection signal to the mode switching circuit 12, which in turn outputs a reading speed switching signal to the microprocessor 8, whereby the reading speed of the microprocessor 8 is switched to a higher reading speed (S3) as a high speed mode. In this case, since the reading speed of the representative single-eye image Ac is switched to the high speed mode with the image reading mode staying set at the one-read mode, the renewal frequency (frame rate) of images input to the motion detection circuit 11 is switched to a high frequency.

This switching operation to the high speed mode in the one-read mode will be described more specifically below, using the above described base rate V. For example, assume that the reading speed of the microprocessor 8 in the one-read mode in the normal imaging, which is one-twelfth of the base rate V, is switched to the base rate V by multiplying the clock for reading by 12, using a multiplier, so as to produce high frame rate images. In this case, the renewal frequency (frame rate) of images input to the motion detection circuit 11 is 12 times higher than that in the normal imaging. This makes it easier to track or detect motion (change) of a suspicious object in the single-eye image Ac (screen on the display unit 16) even if it moves therein.

The thus produced high frame rate images are output via the interface 13 to, and displayed on, the display unit 16 directly without going through the image reconstructing circuit 15. In the high speed mode, the amount of information of an image per frame is smaller than that in a high resolution mode in step S5 later. Accordingly, if the high speed mode uses the same clock as that in the high resolution mode, it is possible to output images in the high speed mode at a frame rate which is higher than the frame rate in the high resolution mode by a multiple of the number of the divided single eyes, i.e., by 12.

Referring back to the flowchart of FIG. 4, the representative single-eye image Ac is displayed on the display unit 16 at a high image renewal frequency (frame rate) in step S3. A user looks at the screen of the display unit 16, and determines whether a detailed image (clearer or higher resolution image) is needed to identify the suspicious object after the user considers the suspicious object to be almost still or unmoving enough to enable imaging of a detailed image. If the user determines that a detailed image is needed (YES in S4), the user uses the user operation unit 12a to operate the mode switching 12 to output a read-mode command signal to the microprocessor 8 to switch the image reading mode of the microprocessor 8 to the all-read mode (S5), namely the high resolution mode.

In the high resolution mode with the image reading mode being in the all-read mode having been switched from the one-read mode, all the 12 single-eye images Ac are sequentially read and reconstructed into one image by the image reconstructing circuit 15, and the thus reconstructed image is displayed on the display unit 16. Accordingly, the image thus displayed on the display unit 16 is a high resolution image. The frame rate (image renewal frequency) in the high resolution mode, on the other hand, is lowered relative to the frame rate in the high speed imaging in step S3. Specifically, since the frame rate is once per unit time in the case where the image reading mode and reading speed are all-read mode and base rate V, respectively, and since the reading speed in the high resolution imaging in step S5 is the base rate V, the frame rate in the high resolution mode is once per unit time.

Thus, a high resolution image of a moving object such as a suspicious moving object can be stored by storing, in the memory 14, the image thus displayed on the display unit 16 in the high resolution imaging in step S5. According to the present embodiment, the one-read mode is used for reading in the normal imaging shown in step S1 above, so that a lower clock frequency can be used for obtaining a necessary frame rate (such as once per unit time in the above-described example), thereby making it possible to reduce the power consumption. Furthermore, a high resolution image can be easily obtained by using the all-read mode for reading in the high resolution imaging shown in step S5 above.

Note that the one-read mode in the present embodiment is to be considered as an example of a partial-read mode in which a part of the single-eye images Ac such as one or two to five single-eye images are selectively read, and are reconstructed by the image reconstructing circuit 15 into one reconstructed image to be displayed on the display unit 16 if the number of the single-eye images Ac is two or more. By using the partial-read mode other than the one-read mode, the image resolution can be increased as compared with the case of the one-read mode, although the frame rate of images displayed on the display unit 16 in the normal imaging and the high speed imaging is reduced in the partial-read mode (other than one-read mode), as compared with the case of the one-read mode, by the ratio of the number (two or more) of the read single-eye images to one.

Hereinafter, a further embodiment of the present invention will be described, in which the compound-eye imaging device 1 is used as an imaging device to be installed in a cellular phone. The compound-eye imaging device 1 according to the present embodiment can also be expressed by the block diagram of FIG. 3. The display unit 16 corresponds to a display monitor in the cellular phone, while the motion detection circuit 11 corresponds to keys of the cellular phone for a user to operate. The compound-eye imaging device 1 to be used for the imaging device in the cellular phone also operates according to the flowchart of FIG. 4, except that both steps S2 and S4 are performed by a user.

More specifically, in the normal imaging, low resolution images are displayed on the display monitor of the cellular phone at a low frame rate. When the user wishes to more reliably track a moving object to be imaged, the user can operate predetermined keys of the cellular phone to switch the imaging to a high speed imaging. Thus, similarly as in the monitoring camera system described above, the compound-eye imaging device 1 for the cellular phone can be driven with low power consumption in the normal imaging. When the user wishes to have a high resolution image of the object to be imaged after the user considers the object to be almost still or unmoving enough to enable imaging of a detailed image to identify the object, the user can again operate predetermined keys of the cellular phone to switch the imaging to a high resolution imaging. It is also possible to store the thus produced high resolution image in the memory 14.

A still further embodiment of the present invention will be described in the following, in which the compound-eye imaging device 1 is used as an imaging device for a face authentication system. The compound-eye imaging device 1 according to the present embodiment can also be expressed by the block diagram of FIG. 3. The display unit 16 corresponds to a display monitor in the face authentication system, while the motion detection circuit 11 corresponds to a detection circuit in the face authentication system for detecting motion of a face of a person in the monitor display, and further has a function to determine the face in the monitor display to be almost still or unmoving enough to enable imaging of a detailed image to identify the face. The compound-eye imaging device 1 to be used for the imaging device in the face authentication system also operates according to the flowchart of FIG. 4, except that both steps S2 and S4 are performed by the motion detection circuit 11.

More specifically, in the normal imaging, low resolution images are displayed on the display monitor of the face authentication system at a low frame rate. Thus, similarly as in the monitoring camera system or the cellular phone described above, the compound-eye imaging device 1 for the face authentication system can be driven with low power consumption in the normal imaging. When the motion detection circuit 11 detects entry of a face of a person in the monitor display by performing an image analysis to compare a current single-eye image Ac with a preceding single-eye image Ac so as to detect a motion (change) in the single-eye image Ac, the motion detection circuit 11 outputs a motion detection (change detection) signal to the mode switching circuit 12, which in turn outputs a reading speed switching signal to the microprocessor 8 to switch the reading speed of the microprocessor 8 to a higher reading speed for high speed imaging.

When the motion detection circuit 11, in the high speed imaging, determines the face in the monitor display to be almost still or unmoving enough to enable imaging of a detailed image to identify the face, the motion detection circuit 11 outputs a read-mode command signal to the mode switching circuit 12, which in turn outputs a read-mode switching signal to the microprocessor 8 to switch the image reading mode of the microprocessor 8 to the all-read mode or high resolution mode. A high resolution image produced in the all-read mode is stored in the memory 14. The thus produced and stored high resolution image of the face can be either directly watched by a user for face authentication or processed by a commercially available face authentication software to authenticate it.

As described in the foregoing, the compound-eye imaging device according to the present invention facilitates an easy and significant change or switch of the frame rate of images displayed on the display unit 16 such as a monitor screen, making it possible to easily obtain a high frame rate without causing an increase of the power consumption, and to perform a high resolution imaging. Accordingly, the compound-eye imaging device of the present invention can be applied not only to the monitoring camera system, cellular phone and face authentication system as described above, but also to other camera systems to reliably image a moving object, such as a camera system mounted in an automobile and a camera system installed in a robot.

It is to be noted that the present invention is not limited to the above-described embodiments, and various modifications are possible. For example, in the embodiment with the compound-eye imaging device being applied to a monitoring camera system described first above, a user determines the need for a detailed image in step S4. However, the motion detection circuit 11 can be designed to determine an object (suspicious object) to be almost still or unmoving enough to capture an identifiable image of the object, making ti possible to automatically switch the image reading mode of the microprocessor 8 to the all-read mode or high resolution mode in step S5, similarly as in the case of the still further embodiment with the compound-eye imaging device being applied to a face authentication system. Furthermore, although the above embodiments show that the motion detection circuit 11 has a memory 11a therein, it is also possible to connect the motion detection circuit 11 to the memory 14, and to allow the memory 14 to have the function of the memory 11a.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2005-302291 filed Oct. 17, 2005, the content of which is hereby incorporated by reference.

What is claimed is:

1. A compound-eye imaging device comprising:
    an optical lens array with multiple integrated optical lenses having optical axes parallel to each other;
    a photodetector array placed at a predetermined distance from the optical lens array for imaging multiple images which are respectively formed by the multiple optical lenses (such images being hereafter referred to as single-eye images);

a motion detection circuit for detecting a change in the representative single-eye image;

an image reading means for reading, at a predetermined reading speed in one of predetermined image reading modes, the single-eye images imaged by the photodetector array; and a reading speed switching means for switching the reading speed of the image reading means, wherein the predetermined image reading modes include an all-read mode in which all the single-eye images on the photodetector array are sequentially read, and a partial-read mode in which a part of the single-eye images on the photodetector array are selectively read, the image reading mode being switchable between the all-read mode and the partial-read mode; and wherein when the motion detection circuit detects a change in the representative single-eye image, the reading speed switching means switches the reading speed of the image reading means from a first reading speed to a second reading speed higher than the first reading speed, with the image reading mode staying set at the partial-read mode.

2. The compound-eye imaging device according to claim 1, wherein after the reading speed switching means switches the reading speed of the image reading means from the first reading speed to the second reading speed, the image reading mode becomes switchable from the partial-read mode to the all-read mode.

3. The compound-eye imaging device according to claim 2, wherein the predetermined reading speed of the image reading means is changeable.

4. The compound-eye imaging device according to claim 3, wherein the partial-read mode is a one-read mode for reading one single-eye image on the photodetector array.

5. The compound-eye imaging device according to claim 2, wherein the partial-read mode is a one-read mode for reading one single-eye image on the photodetector array.

6. The compound-eye imaging device according to claim 1, wherein the partial-read mode is a one-read mode for reading one single-eye image on the photodetector array.

7. The compound-eye imaging device according to claim 1, wherein the predetermined reading speed of the image reading means is changeable.

* * * * *